(12) United States Patent
Ma et al.

(10) Patent No.: US 11,198,619 B2
(45) Date of Patent: Dec. 14, 2021

(54) METHOD FOR EFFICIENTLY PREPARING FERRATE BASED ON NASCENT INTERFACIAL ACTIVITY

(71) Applicant: Harbin Institute of Technology, Harbin (CN)

(72) Inventors: Jun Ma, Harbin (CN); Yulei Liu, Harbin (CN); Lu Wang, Harbin (CN); Qingliang Liu, Harbin (CN); Xiaodan Zhao, Harbin (CN)

(73) Assignee: Harbin Institute of Technology, Harbin (CN)

( * ) Notice: Subject to any disclaimer, the term of this patent is extended or adjusted under 35 U.S.C. 154(b) by 448 days.

(21) Appl. No.: 16/250,435

(22) Filed: Jan. 17, 2019

(65) Prior Publication Data

US 2019/0144297 A1    May 16, 2019

Related U.S. Application Data

(62) Division of application No. 15/113,615, filed as application No. PCT/CN2015/071374 on Jan. 22, 2015, now Pat. No. 10,196,279.

(30) Foreign Application Priority Data

Jan. 22, 2014 (CN) .......................... 201410029552.5

(51) Int. Cl.
*C01G 49/00* (2006.01)

(52) U.S. Cl.
CPC ..... *C01G 49/0027* (2013.01); *C01G 49/0081* (2013.01); *C01G 49/0036* (2013.01)

(58) Field of Classification Search
CPC ............ C01G 49/0036; C01G 49/0027; C01G 49/0081
See application file for complete search history.

(56) References Cited

U.S. PATENT DOCUMENTS

| | | | | |
|---|---|---|---|---|
| 5,785,862 | A | ‡ | 7/1998 | Graham ................. C01G 49/14 210/723 |
| 8,961,921 | B2 | * | 2/2015 | Sharma ............. C01G 49/0081 423/594.2 |

FOREIGN PATENT DOCUMENTS

| CN | 103145189 A | * | 6/2013 |
|---|---|---|---|
| CN | 103145189 A | ‡ | 6/2013 |

* cited by examiner
‡ imported from a related application

*Primary Examiner* — James A Fiorito
(74) *Attorney, Agent, or Firm* — Novoclaims Patent Services LLC; Mei Lin Wong

(57) ABSTRACT

A method for efficiently preparing ferrate based on nascent state interfacial activity. The method is as follows: (a) preparing nascent iron solution; (b) adding an oxidizing agent to the iron solution of step (a); (c) adding alkali solution or alkali particles to the mixed solution of step (b), mixing by stirring, and carrying out solid-liquid separation; (d) adding a stabilizing agent to the liquid separated out in step (c), and thus obtaining ferrate solution. The yield is 78-98%. The prepared ferrate solution is stable and can be stored for 3-15 days.

14 Claims, No Drawings

METHOD FOR EFFICIENTLY PREPARING FERRATE BASED ON NASCENT INTERFACIAL ACTIVITY

CROSS REFERENCE OF RELATED APPLICATION

This is a divisional application of a non-provisional application Ser. No. 15/113,615, filing date Jul. 22, 2016, which is a national phase national application of an international patent application number PCT/CN2015/071374, filing date Jan. 22, 2015, which claimed priority of Chinese application number 201410029552.5, filing date Jan. 22, 2014. The contents of these specifications, including any intervening amendments thereto, are incorporated herein by reference.

BACKGROUND OF THE PRESENT INVENTION

Field of Invention

The present invention relates to a preparation method of a compound, and more particular to a preparation method for ferrate.

Description of Related Arts

Ferrate has a strong oxidizing function under a relatively wide pH range and is capable of oxidizing many organic or inorganic substances. For examples, inorganic compounds such as $NH^{2+}$, $S_2O_3^{2-}$, $SCN^-$, $H_2$; heavy metals such as Arsenic and chromium; radioactive substances such as uranium; and organic compounds such as alcohols, acids, amines, hydroxyl-ketones, hydroquinones and phenols. Ferrate is an ideal, highly effective and highly selective oxidant which will not cause any damaging effect to humans and other living organisms or to the environment. Also, ferrate ions in aqueous solution can kill $E.\ coli$ and general bacteria, and remove the hazardous organic substances, $—NO^{2-}$, poisonous $CN^-$ and etc. in wastewater. In addition, the $Fe(OH)_3$ produced by decomposition of ferrate ions can be used as an adsorption agent to adsorb different kinds of cations and anions and thus a very good water purification function is provided. Accordingly, ferrate is also an ideal water treatment agent for industrial wastewater and drinking water. However, since the preparation process of ferrate is complicated and the investment cost is high, large scale application of ferrate salts is restricted.

At present, a more common approach is to utilize the wet oxidation method to prepare ferrate salts. For the applications of wet oxidation to prepare ferrate salts, a lot of researches have been done by many domestic and foreign scholars. The U.S. Pat. No. 06,331,949 disclosed a preparation method which uses potassium hydroxide, chlorine, ferric chloride, silicate and iodate to produce ferrate. The Japan patent Kokai 80/75926, which was published in T. Morishita on Jun. 7, 1980, disclosed a preparation method which uses the molten iron or iron oxide with potassium nitrate and potassium hydroxide to produce ferrate. The patent number EP19820305914 disclosed a preparation method which uses potassium hypochlorite and ferric salts with adding strongly alkaline reagent to produce ferrate. However, since the ferrate solution is very unstable, dimethylsulfoxide, dimethyl sulfone and methanol are used in the ferrate purification process. The U.S. Pat. No. 5,217,584 disclosed that beta-ferric oxide is used as the iron source, iodine-containing or tellurium-containing salt of sodium potassium are used as the stabilizing compounds, and hypochlorous acid is utilized to produce ferrate, where the reaction temperature is 18~25° C. and the reaction time is 1~6 hours. In the patent number CN101497461A, a rapid preparation process for ferrate solution which uses Iron (II, III) oxide as the iron source for reaction under microwave irradiation condition is disclosed.

The above papers do not teach or suggest any ferrate preparation method which utilizes iron in nascent state as the iron source, wherein the papers regarding chemical wet method mostly utilizes iron salts such as ferric chloride, ferric sulfate or ferric nitrate as the iron source.

SUMMARY OF THE PRESENT INVENTION

In order to solve the problems of conventional preparation method for ferrate salts which involve complicate process while the stability of ferrate salt products is very low, an object of the present invention is to provide a preparation method for ferrate based on activity in nascent state interface.

Technical Solution

A high efficiency preparation method for ferrate based on activity in nascent state interface, comprises the followings steps of:

(a) adding iron salt to a first alkaline solution having a pH of 5~9 for hydrolysis and producing an iron solution in nascent state with an equivalent concentration of iron of 0.0001~1 mol/L;

(b) weighing and obtaining 5~100 mL of the iron solution in nascent state from step (a), adding oxidizing agent based on a molar ratio of the iron in nascent state and the oxidizing agent at 1:0.1~20, and allowing to mix to obtain a mixture;

(c) under the condition of 5° C.~60° C., adding 5~100 mL the second alkaline solution with a concentration of 0.1~16 mol/L or adding 0.2~70 g alkaline granules to the mixture obtained from the step (b); stirring and mixing for 0.1~30 min; allowing the solution to turn purplish black color completely and then process solid-liquid separation by centrifugation or filtration to obtain a liquid; and (d) adding stabilizing agent based on a molar ratio of the equivalent concentration of iron in the liquid obtained from the step (c) and the stabilizing agent of 1:0.1~10 to obtain a ferrate solution, where the yield is 78~98%.

Advantageous Effect

The present invention utilizes divalent or trivalent iron salt and weak alkaline solution for hydrolysis reaction to produce iron in nascent state while a portion of the energy is released in the hydrolysis of iron ions at the same time; therefore the heat produced by the reaction between oxidants, the alkali and the iron in nascent state is reduced dramatically. Accordingly, the method of the present invention can be used under a relatively large temperature range and no ice bath is required. Also, the nascent state iron produced has a large surface area ratio and strong reactivity, thus the reaction can occur quickly and steadily. In addition, in the process of preparing ferrate of the present invention, a stabilizing agent which contains one or more of sodium perchlorate, sodium carbonate, potassium carbonate, sodium pyrophosphate, sodium silicate, peracetic acid, hydrogen peroxide, sodium hypochlorite, potassium hypochlorite, sodium phosphate is added such that the stability of the ferrate solution being produced is increased dramatically and can be stored for 3~15 days.

DETAILED DESCRIPTION OF THE PREFERRED EMBODIMENT

The embodiment of the present invention as shown and described below is exemplary only and not intended to be limiting. This invention includes all combinations of different embodiments of the present invention.

Preferred embodiment 1: According to a high efficiency preparation method for ferrate based on activity in nascent state interface of the preferred embodiment of the present invention, the method comprises the steps of:

(a) adding iron salt to a first alkaline solution having a pH of 5~9 for hydrolysis and producing an iron solution in nascent state with an equivalent concentration of iron of 0.0001~1 mol/L;

(b) measuring and obtaining 5~100 mL of the iron solution in nascent state obtained from step (a), adding oxidizing agent based on a molar ratio of the iron in nascent state and the oxidizing agent at 1:0.1~20, and allowing to mix to obtain a mixture;

(c) under the condition of 5° C.~60° C., adding 5~100 mL second alkaline solution with a concentration of 0.1~16 mol/L or adding 0.2~70 g alkaline granules to the mixture obtained from the step (b); stirring and mixing for 0.1~30 min; allowing the solution to turn purplish black color completely and then process solid-liquid separation by centrifugation or filtration to obtain a liquid; and (d) adding stabilizing agent based on a molar ratio of the equivalent concentration of iron in the liquid obtained from the step (c) and the stabilizing agent of 1:0.1~10 to obtain a ferrate solution, wherein a yield is 80~98%.

Preferred embodiment 2: The difference between this preferred embodiment and the above preferred embodiment 1 is that: in the step (a), the iron salt is one or a combination of the group consisting of: ferric nitrate, ferrous nitrate, ferric sulfate, ferrous sulfate, ferrous chloride and ferric chloride. All others are the same as that of the above preferred embodiment 1.

According to this embodiment, if the iron salt is a combination of different compounds, the ratio of different compounds can be any ratio.

Preferred embodiment 3: The difference between this preferred embodiment and the above preferred embodiment 1 or 2 is that: in the step (a), the first alkaline solution is one or a combination of the group consisting of: sodium phosphate, disodium hydrogen phosphate solution, sodium aluminate, sodium borate, sodium acetate, sodium bicarbonate solution, sodium carbonate solution, sodium silicate solution, potassium carbonate solution and potassium bicarbonate solution. All others are the same as that of the above preferred embodiment 1 or 2.

According to this embodiment, if the first alkaline solution is a combination of different compounds, the ratio of different compounds can be any ratio.

Preferred embodiment 4: The difference between this preferred embodiment and one of the above preferred embodiments 1-3 is that: in the step (b), the oxidizing agent is one or a combination of the group consisting of: perchloric acid, peracetic acid, sodium persulfate, potassium persulfate, potassium monopersulfate, sodium hypochlorite, potassium hypochlorite and ozone. All others are the same as that one of the above preferred embodiments 1-3.

According to this embodiment, if the oxidizing agent is a combination of different compounds, the ratio of different compounds can be any ratio.

Preferred embodiment 5: The difference between this preferred embodiment and one of the above preferred embodiments 1-4 is that: in the step (c), the alkaline granules is one or a combination of the group consisting of: potassium hydroxide and sodium hydroxide; in the step (c), the second alkaline solution is one or a combination of the group consisting of: potassium hydroxide solution and sodium hydroxide solution All others are the same as that one of the above preferred embodiments 1-4.

According to this embodiment, if the second alkaline solution is a combination of different compounds, the ratio of different compounds can be any ratio.

Preferred embodiment 6: The difference between this preferred embodiment and one of the above preferred embodiments 1-5 is that: in the step (d), the stabilizing agent is one or a combination of the group consisting of: sodium perchlorate, sodium carbonate, sodium hydrogencarbonate, potassium carbonate, potassium bicarbonate, sodium pyrophosphate, peracetic acid, hydrogen peroxide, sodium hypochlorite, potassium hypochlorite and sodium phosphate. All others are the same as that one of the above preferred embodiments 1-5.

According to this embodiment, if the stabilizing agent is a combination of different compounds, the ratio of different compounds can be any ratio.

Preferred embodiment 7: According to a high efficiency preparation method for ferrate based on activity in nascent state interface of the preferred embodiment of the present invention, the method comprises the steps of:

(a) adding iron salt to a first alkaline solution having a pH of 5~9 for hydrolysis and producing an iron solution in nascent state with an equivalent concentration of iron of 0.0001~1 mol/L;

(b) measuring and obtaining 5~100 mL of the iron solution in nascent state from step (a), adding 5~100 mL second alkaline solution with a concentration of 0.1~16 mol/L or adding 0.2~70 g alkaline granules to the iron solution in nascent state; stirring to mix and obtaining a mixture;

(c) under the condition of 5° C.~60° C., adding oxidizing agent based on a molar ratio of the iron in nascent state and the oxidizing agent at 1:0.1~20 to the mixture obtained from the step (b), stirring and mixing for 0.1~30 min; allowing the solution to turn purplish black color completely and then process solid-liquid separation by centrifugation or filtration to obtain a liquid; and (d) adding stabilizing agent based on a molar ratio of the equivalent concentration of iron in the liquid obtained from the step (c) and the stabilizing agent of 1:0.1~10 to obtain a ferrate solution, wherein a yield is 78~98%.

Preferred embodiment 8: The difference between this preferred embodiment and the above preferred embodiment 7 is that:

in the step (a), the iron salt is one or a combination of the group consisting of: ferric nitrate, ferrous nitrate, ferric sulfate, ferrous sulfate, ferrous chloride and ferric chloride;

in the step (a), the first alkaline solution is one or a combination of the group consisting of: sodium phosphate, disodium hydrogen phosphate solution, sodium aluminate, sodium borate, sodium acetate, sodium bicarbonate solution, sodium carbonate solution, sodium silicate solution, potassium carbonate solution and potassium bicarbonate solution;

in the step (b), the alkaline granules is one or a combination of the group consisting of: potassium hydroxide and sodium hydroxide; in the step (b), the second alkaline solution is one or a combination of the group consisting of: potassium hydroxide solution and sodium hydroxide solution;

in the step (c), the oxidizing agent is one or a combination of the group consisting of: perchloric acid, peracetic acid, sodium persulfate, potassium persulfate, potassium monopersulfate, sodium hypochlorite, potassium hypochlorite and ozone;

in the step (d), the stabilizing agent is one or a combination of the group consisting of: sodium perchlorate, sodium carbonate, sodium hydrogen carbonate, potassium carbonate, potassium bicarbonate, sodium pyrophosphate, peracetic acid, hydrogen peroxide, sodium hypochlorite, potassium hypochlorite and sodium phosphate. All others are the same as that of the above preferred embodiment 7.

According to this embodiment, if the iron salt is a combination of different compounds, the ratio of different compounds can be any ratio.

According to this embodiment, if the first alkaline solution is a combination of different compounds, the ratio of different compounds can be any ratio.

According to this embodiment, if the oxidizing agent is a combination of different compounds, the ratio of different compounds can be any ratio.

According to this embodiment, if the second alkaline solution is a combination of different compounds, the ratio of different compounds can be any ratio.

According to this embodiment, if the stabilizing agent is a combination of different compounds, the ratio of different compounds can be any ratio.

Preferred embodiment 9: According to a high efficiency preparation method for ferrate based on activity in nascent state interface of the preferred embodiment of the present invention, the method comprises the steps of:

(a) adding iron salt to a first alkaline solution having a pH of 5~9 for hydrolysis and producing an iron solution in nascent state with an equivalent concentration of iron of 0.0001~1 mol/L;

(b) measuring and obtaining 5~100 mL of the iron solution in nascent state from step (a), adding oxidizing agent based on a molar ratio of the iron in nascent state and the oxidizing agent at 1:0.1~20, and allowing to mix to obtain a mixture;

(c) mixing 5~100 mL second alkaline solution with a concentration of 0.1~16 mol/L or adding 0.2~70 g alkaline granules with a stabilizing agent; and (d) under the condition of 5° C.~60° C., adding the product obtained from step (c), to the mixture obtained from the step (b); stirring and mixing for 0.1~30 min; allowing the solution to turn purplish black color completely and then process solid-liquid separation by centrifugation or filtration to obtain a ferrate solution, wherein a yield is 84~98%;

wherein a molar ratio of the stabilizing agent in the step (c) and the iron in nascent state in the step (b) is 1:0.1~10.

Preferred embodiment 10: The difference between this preferred embodiment and the above preferred embodiment 9 is that:

in the step (a), the iron salt is one or a combination of the group consisting of: ferric nitrate, ferrous nitrate, ferric sulfate, ferrous sulfate, ferrous chloride and ferric chloride;

in the step (a), the first alkaline solution is one or a combination of the group consisting of: sodium phosphate, disodium hydrogen phosphate solution, sodium aluminate, sodium borate, sodium acetate, sodium bicarbonate solution, sodium carbonate solution, sodium silicate solution, potassium carbonate solution and potassium bicarbonate solution;

in the step (b), the oxidizing agent is one or a combination of the group consisting of: perchloric acid, peracetic acid, sodium persulfate, potassium persulfate, potassium monopersulfate, sodium hypochlorite, potassium hypochlorite and ozone;

in the step (c), the alkaline granules is one or a combination of the group to consisting of: potassium hydroxide and sodium hydroxide; in the step (b), the second alkaline solution is one or a combination of the group consisting of: potassium hydroxide solution and sodium hydroxide solution;

in the step (c), the stabilizing agent is one or a combination of the group consisting of: sodium perchlorate, sodium carbonate, sodium hydrogen carbonate, potassium carbonate, potassium bicarbonate, sodium pyrophosphate, peracetic acid, hydrogen peroxide, sodium hypochlorite, potassium hypochlorite and sodium phosphate.

All others are the same as that of the above preferred embodiment 9.

According to this embodiment, if the iron salt is a combination of different compounds, the ratio of different compounds can be any ratio.

According to this embodiment, if the first alkaline solution is a combination of different compounds, the ratio of different compounds can be any ratio.

According to this embodiment, if the oxidizing agent is a combination of different compounds, the ratio of different compounds can be any ratio.

According to this embodiment, if the second alkaline solution is a combination of different compounds, the ratio of different compounds can be any ratio.

According to this embodiment, if the stabilizing agent is a combination of different compounds, the ratio of different compounds can be any ratio.

The following experiments are used to test and verify the advantageous effect of the present invention:

Experiment 1:

A high efficiency preparation method for ferrate based on activity in nascent state interface comprises the following steps of:

(a) adding ferric nitrate to sodium borate solution having a pH of 5~6 for hydrolysis under room temperature for 5~30 min and producing an iron solution in nascent state with an equivalent concentration of iron of 0.0001~0.0005 mol/L;

(b) measuring and obtaining 5 mL of the iron solution in nascent state obtained from the step (a), adding peracetic acid based on a molar ratio of the iron in nascent state and the peracetic acid of 1:0.1~0.2, and allowing to mix to obtain a mixture;

(c) under the condition of 5° C., adding 5 mL sodium hydroxide solution with a concentration of 0.1~0.2 mol/L to the mixture obtained from the step (b); stirring and mixing for 25~30 min; allowing the solution to turn purplish black color completely and then process solid-liquid separation by centrifugation or filtration to obtain a liquid; and (d) adding sodium perchlorate based on a molar ratio of the equivalent concentration of iron in the liquid obtained from the step (c) and the sodium perchlorate of 1:1~2 to obtain a ferrate solution, where a yield is 87~90%.

The resulting ferrate solution obtained from this experiment can be stored for 5~15 days.

Experiment 2:

A high efficiency preparation method for ferrate based on activity in nascent state interface comprises the following steps of:

(a) adding an iron salt ferric sulfate to an alkaline solution having a pH of 8~9 for hydrolysis under room temperature for 5~30 min and producing an iron solution in nascent state having an equivalent concentration of iron of 0.001~0.005 mol/L;

(b) measuring and obtaining 5 mL of the iron solution in nascent state obtained from the step (a), adding potassium hypochlorite based on a molar ratio of the iron in nascent state and the potassium hypochlorite of 1:1~2, and allowing to mix to obtain a mixture;

(c) under the condition of 15° C., adding 5 mL potassium hydroxide with a concentration of 1~2 mol/L to the mixture obtained from the step (b); stirring and mixing for 2.5~5 min; allowing the solution to turn purplish black color completely and then process solid-liquid separation by centrifugation or filtration to obtain a liquid; and (d) adding sodium perchlorate based on a molar ratio of the equivalent concentration of iron in the liquid obtained from the step (c) and the sodium perchlorate of 1:3~5 to obtain a ferrate solution, where a yield is 95~98%.

The iron salt is a mixture of ferric nitrate, ferrous nitrate, ferric sulfate, ferrous sulfate and ferrous chloride at any ratio.

The alkaline solution is mixture of sodium phosphate, disodium hydrogen phosphate solution, sodium aluminate, sodium borate, sodium acetate, sodium bicarbonate solution, sodium carbonate solution, sodium silicate solution, potassium carbonate solution and potassium bicarbonate solution at any ratio.

The resulting ferrate solution obtained from this experiment can be stored for 5~14 days.

Experiment 3:

A high efficiency preparation method for ferrate based on activity in nascent state interface comprises the following steps of:

(a) adding an iron to sodium carbonate solution having a pH of 7~8 for hydrolysis under room temperature for 5~30 min and producing an iron solution in nascent state with an equivalent concentration of iron of 0.0001~0.0005 mol/L;

(b) measuring and obtaining 10 mL of the iron solution in nascent state obtained from the step (a), adding potassium monopersulfate based on a molar ratio of the iron in nascent state and the potassium monopersulfate of 1:2~3, and allowing to mix to obtain a mixture;

(c) under the condition of 20° C., adding 15 mL potassium hydroxide with a concentration of 6~8 mol/L to the mixture obtained from the step (b); stirring and mixing for 1.5~3 min; allowing the solution to turn purplish black color completely and then process solid-liquid separation by centrifugation or filtration to obtain a liquid; and (d) adding sodium silicate based on a molar ratio of the equivalent concentration of iron in the liquid obtained from the step (c) and the sodium silicate of 1:0.1~5 to obtain a ferrate solution, where a yield is 94~98%.

The iron salt is a mixture of ferric nitrate, ferrous nitrate, ferric sulfate, ferrous sulfate and ferrous chloride at any ratio.

The resulting ferrate solution obtained from this experiment can be stored for 6~15 days.

Experiment 4:

A high efficiency preparation method for ferrate based on activity in nascent state interface comprises the following steps of:

(a) adding an iron to potassium bicarbonate solution having a pH of 7~9 for hydrolysis under room temperature for 5~30 min and producing an iron solution in nascent state with an equivalent concentration of iron of 0.01~0.02 mol/L;

(b) measuring and obtaining 20 mL of the iron solution in nascent state obtained from the step (a), adding an oxidizing agent based on a molar ratio of the iron in nascent state and the oxidizing agent of 1:0.1~0.2, and allowing to mix to obtain a mixture;

(c) under the condition of 35° C., adding 20 mL potassium hydroxide with a concentration of 6~8 mol/L to the mixture obtained from the step (b); stirring and mixing for 15~20 min; allowing the solution to turn purplish black color completely and then process solid-liquid separation by centrifugation or filtration to obtain a liquid; and (d) adding sodium perchlorate based on a molar ratio of the equivalent concentration of iron in the liquid obtained from the step (c) and the sodium perchlorate of 1:4~5 to obtain a ferrate solution, where a yield is 89~93%.

The iron salt is a mixture of ferric nitrate, ferrous nitrate, ferric sulfate, ferrous sulfate and ferrous chloride at any ratio.

The oxidizing agent is a mixture of perchloric acid, peracetic acid, sodium persulfate, potassium persulfate, potassium monopersulfate, sodium hypochlorite, potassium hypochlorite and ozone at any ratio.

The resulting ferrate solution obtained from this experiment can be stored for 7~15 days.

Experiment 5:

A high efficiency preparation method for ferrate based on activity in nascent state interface comprises the following steps of:

(a) adding an iron to sodium acetate solution having a pH of 5~7 for hydrolysis under room temperature for 5~30 min and producing an iron solution in nascent state with an equivalent concentration of iron of 0.007~0.01 mol/L;

(b) measuring and obtaining 10 mL of the iron solution in nascent state obtained from the step (a), adding an oxidizing agent based on a molar ratio of the iron in nascent state and the oxidizing agent of 1:0.1~0.2, and allowing to mix to obtain a mixture;

(c) under the condition of 25° C., adding 4.5~5 g granules of potassium hydroxide or sodium hydroxide to the mixture obtained from the step (b); stirring and mixing for 2~5 min; allowing the solution to turn purplish black color completely and then process solid-liquid separation by centrifugation or filtration to obtain a liquid; and (d) adding sodium perchlorate based on a molar ratio of the equivalent concentration of iron in the liquid obtained from the step (c) and the sodium perchlorate of 1:0.1~0.5 to obtain a ferrate solution, where a yield is 82~85%.

The iron salt is a mixture of ferric nitrate, ferrous nitrate, ferric sulfate, ferrous sulfate and ferrous chloride at any ratio.

The oxidizing agent is a mixture of perchloric acid, peracetic acid, sodium persulfate, potassium persulfate, potassium monopersulfate, sodium hypochlorite, potassium hypochlorite and ozone at any ratio.

The resulting ferrate solution obtained from this experiment can be stored for 8~15 days.

What is claimed is:

1. A high efficiency preparation method for ferrate based on activity in nascent state interface, characterized in that, the high efficiency preparation method for ferrate based on activity in nascent state interface comprises the steps of:
   (a) adding solid iron salt to a first alkaline solution with a pH of 5~9 for hydrolysis and producing an iron solution in nascent state with an equivalent concentration of iron of 0.0001~1 mol/L;
   (b) measuring and obtaining 5~100 mL of the iron solution in nascent state from step (a), adding an oxidizing agent based on a molar ratio of the iron in nascent state and the oxidizing agent at 1:0.1~20 and mixing the oxidizing agent with the iron solution in nascent state to obtain a mixture;

(c) under 5° C.-60° C., adding 5-100 mL second alkaline solution or 0.2~70 g alkaline granules to the mixture from the step (b), wherein the second alkaline solution has a concentration of 0.1~16 mol/L; then stirring and mixing for 0.1~30 min to form an intermediate solution; after the intermediate solution turns purplish black color completely, processing solid-liquid separation by centrifugation or filtration to obtain a liquid; and (d) adding stabilizing agent based on a molar ratio of the equivalent concentration of iron in the liquid from the step (c) and the stabilizing agent to obtain a ferrate solution, where a molar ratio of an equivalent concentration or iron in the liquid from the step (c) to the stabilizing agent is 1:0.1-10.

2. The high efficiency preparation method for ferrate based on activity in nascent state interface according to claim 1, characterized in that, in the step (a), the iron salt is one or more of the group consisting of: ferric nitrate, ferrous nitrate, ferric sulfate, ferrous sulfate, ferrous chloride and ferric chloride.

3. The high efficiency preparation method for ferrate based on activity in nascent state interface according to claim 1, characterized in that, in the step (a), the first alkaline solution is one or more of the group consisting of: sodium phosphate, disodium hydrogen phosphate solution, sodium aluminate, sodium borate, sodium acetate, sodium bicarbonate solution, sodium carbonate solution, sodium silicate solution, potassium carbonate solution and potassium bicarbonate solution.

4. The high efficiency preparation method for ferrate based on activity in nascent state interface according to claim 1, characterized in that, in the step (b), the oxidizing agent is one or more of the group consisting of: perchloric acid, peracetic acid, sodium persulfate, potassium persulfate, potassium monopersulfate, sodium hypochlorite, potassium hypochlorite and ozone.

5. The high efficiency preparation method for ferrate based on activity in nascent state interface according to claim 1, characterized in that, in the step (c), the alkaline granules is one or more of the group consisting of: potassium hydroxide and sodium hydroxide; the second alkaline solution is one or more of the group consisting of: potassium hydroxide solution and sodium hydroxide solution.

6. The high efficiency preparation method for ferrate based on activity in nascent state interface according to claim 1, characterized in that, in the step (d), the stabilizing agent is one or more of the group consisting of: sodium perchlorate, sodium carbonate, sodium hydrogen carbonate, potassium carbonate, potassium bicarbonate, sodium pyrophosphate, peracetic acid, sodium hypochlorite, potassium hypochlorite and sodium phosphate.

7. A high efficiency preparation method for ferrate based on activity in nascent state interface, characterized in that, the high efficiency preparation method for ferrate based on activity in nascent state interface comprises the steps of:

(a) adding solid iron salt to a first alkaline solution with a pH of 5~9 for hydrolysis and producing an iron solution in nascent state with an equivalent concentration of iron of 0.0001~1 mol/L;

(b) measuring and obtaining 5~100 mL of the iron solution in nascent state from the step (a), adding 5~100 mL second alkaline solution or 0.2~70 g alkaline granules to the iron solution in nascent state, wherein with the second alkaline solution has a concentration of 0.1~16 mol/L; stirring to mix and obtaining a mixture;

(c) under 5° C.-60° C., adding an oxidizing agent based on a molar ratio of the iron in nascent state and the oxidizing agent at 1:0.1~20 to the mixture obtained from the step (b), stirring and mixing for 0.1~30 min to form an intermediate solution; after the intermediate solution turns purplish black color completely, processing solid-liquid separation by centrifugation or filtration to obtain a liquid; and (d) adding stabilizing agent based on a molar ratio of the equivalent concentration of iron in the liquid obtained from the step (c) and the stabilizing agent to obtain a ferrate solution, wherein a molar ratio of an equivalent concentration of iron in the liquid from the step (c) to the stabilizing agent is 1:0.1-10.

8. The high efficiency preparation method for ferrate based on activity in nascent state interface according to claim 7, characterized in that, in the step (a), the iron salt is one or more of the group consisting of: ferric nitrate, ferrous nitrate, ferric sulfate, ferrous sulfate, ferrous chloride and ferric chloride;

in the step (a), the first alkaline solution is one or more of the group consisting of: sodium phosphate, disodium hydrogen phosphate solution, sodium aluminate, sodium borate, sodium acetate, sodium bicarbonate solution, sodium carbonate solution, sodium silicate solution, potassium carbonate solution and potassium bicarbonate solution;

in the step (b), the alkaline granules is one or more of the group consisting of: potassium hydroxide and sodium hydroxide; in the step (b), the second alkaline solution is one or more of the group consisting of: potassium hydroxide solution and sodium hydroxide solution;

in the step (c), the oxidizing agent is one or more of the group consisting of: perchloric acid, peracetic acid, sodium persulfate, potassium persulfate, potassium monopersulfate, sodium hypochlorite, potassium hypochlorite and ozone;

in the step (d), the stabilizing agent is one or more of the group consisting of: sodium perchlorate, sodium carbonate, sodium hydrogen carbonate, potassium carbonate, potassium bicarbonate, sodium pyrophosphate, peracetic acid, sodium hypochlorite, potassium hypochlorite and sodium phosphate.

9. The high efficiency preparation method for ferrate based on activity in nascent state interface according to claim 2, characterized in that, in the step (c), the alkaline granules is one or more of the group consisting of: potassium hydroxide and sodium hydroxide; the second alkaline solution is one or more of the group consisting of: potassium hydroxide solution and sodium hydroxide solution.

10. The high efficiency preparation method for ferrate based on activity in nascent state interface according to claim 2, characterized in that, in the step (d), the stabilizing agent is one or more of the group consisting of: sodium perchlorate, sodium carbonate, sodium hydrogen carbonate, potassium carbonate, potassium bicarbonate, sodium pyrophosphate, peracetic acid, sodium hypochlorite, potassium hypochlorite and sodium phosphate.

11. The high efficiency preparation method for ferrate based on activity in nascent state interface according to claim 3, characterized in that, in the step (c), the alkaline granules is one or more of the group consisting of: potassium hydroxide and sodium hydroxide; the second alkaline solution is one or more of the group consisting of: potassium hydroxide solution and sodium hydroxide solution.

12. The high efficiency preparation method for ferrate based on activity in nascent state interface according to claim 3, characterized in that, in the step (d), the stabilizing agent is one or more of the group consisting of: sodium perchlorate, sodium carbonate, sodium hydrogen carbonate, potassium carbonate, potassium bicarbonate, sodium pyrophosphate, peracetic acid, sodium hypochlorite, potassium hypochlorite and sodium phosphate.

13. The high efficiency preparation method for ferrate based on activity in nascent state interface according to claim 4, characterized in that, in the step (c), the alkaline granules is one or more of the group consisting of: potassium hydroxide and sodium hydroxide; the second alkaline solution is one or more of the group consisting of: potassium hydroxide solution and sodium hydroxide solution.

14. The high efficiency preparation method for ferrate based on activity in nascent state interface according to claim 4, characterized in that, in the step (d), the stabilizing agent is one or more of the group consisting of: sodium perchlorate, sodium carbonate, sodium hydrogen carbonate, potassium carbonate, potassium bicarbonate, sodium pyrophosphate, peracetic acid, sodium hypochlorite, potassium hypochlorite and sodium phosphate.

* * * * *